US006458278B1

United States Patent
Leoncavallo et al.

(10) Patent No.: US 6,458,278 B1
(45) Date of Patent: Oct. 1, 2002

(54) FILTERING UNIT HAVING SEPARATELY ATTACHABLE FILTER CASSETTE, FILTER CASSETTE, AND METHOD OF FILTERING

(75) Inventors: Richard A. Leoncavallo, Pittsford; Mark Giverc, Palmyra, both of NY (US)

(73) Assignee: Nalge Nunc International Corporation, Rochester, NY (US)

( * ) Notice: Subject to any disclaimer, the term of this patent is extended or adjusted under 35 U.S.C. 154(b) by 0 days.

(21) Appl. No.: 09/255,201

(22) Filed: Feb. 22, 1999

(51) Int. Cl.[7] .......................... B01D 61/00; B01D 63/00
(52) U.S. Cl. ..................... 210/650; 210/477; 210/478; 210/321.75; 210/767; 210/416.1; 422/100; 422/101
(58) Field of Search ................ 210/321.75, 321.84, 210/473, 477, 478, 482, 416.1, 416.2, 650, 767, 445; 422/101, 100, 99

(56) References Cited

U.S. PATENT DOCUMENTS

| | | | | |
|---|---|---|---|---|
| 3,295,686 A | * | 1/1967 | Krueger | 210/445 |
| 4,229,306 A | * | 10/1980 | Hein et al. | 210/446 |
| 4,357,240 A | * | 11/1982 | Mehra et al. | 210/446 |
| 4,678,576 A | * | 7/1987 | Leoncavallo | |
| 4,702,834 A | * | 10/1987 | Relyea | 210/474 |
| 4,849,061 A | * | 7/1989 | Relyea | 210/321.78 |
| 5,141,639 A | * | 8/1992 | Kraus et al. | 210/321.75 |
| 5,217,619 A | * | 6/1993 | Redmond, Jr. et al. | 210/650 |
| 5,221,483 A | | 6/1993 | Glenn et al. | |
| 5,464,541 A | * | 11/1995 | Aysta et al. | 210/416.1 |
| 5,490,927 A | * | 2/1996 | Herczeg | |
| 5,601,711 A | * | 2/1997 | Sklar et al. | |
| 5,603,900 A | * | 2/1997 | Clark et al. | 210/321.75 |
| 5,792,425 A | * | 8/1998 | Clark et al. | 210/321.75 |

FOREIGN PATENT DOCUMENTS

| | | |
|---|---|---|
| DE | 3711735 | 10/1998 |
| EP | 0223323 A | 5/1987 |
| WO | 9636428 A | 11/1996 |

OTHER PUBLICATIONS

Nalge Nunc International, *Nalgene® Labware*, Catalog, 1998–1999.
Millipore, Membrane Devices for Sterlie Filtration Ordering Information, Brochure, Jan. 1997.
Corning Costar, Corning Filter Systems, Even Better, Top to Bottom, Brochure, Nov. 1997.

* cited by examiner

*Primary Examiner*—Ana Fortuna
(74) *Attorney, Agent, or Firm*—Wood, Herron & Evans, L.L.P.

(57) ABSTRACT

A filtering unit including an upper container for receiving fluid to be filtered, a lower container for receiving the fluid from the upper container and an intermediate filter cassette. The filter cassette includes a support member connected with a flat filter member, such as a membrane filter, and can be removed with respect to each of the upper and lower containers. The filter cassette may be inserted within the upper container with sealing engagement between the support member and the internal wall of the upper container. The various disclosed embodiments include the ability to serially connect multiple filter cassettes generally between the liquid contained in the upper container and the lower container.

14 Claims, 9 Drawing Sheets

FILTERING UNIT HAVING SEPARATELY ATTACHABLE FILTER CASSETTE, FILTER CASSETTE, AND METHOD OF FILTERING

FIELD OF THE INVENTION

The present invention generally relates to filter technology and, more specifically, to filtering units having flat filter members, such as membrane filters, depth filters or prefilters used in laboratory or research facilities.

BACKGROUND OF THE INVENTION

A wide variety of filtering apparatus exists for separating particles from liquid. The choice of which type of filtering apparatus to use in a given application depends mainly on particle size and throughput parameters. Generally, particles of a size greater than 10 µm may be separated from liquids using a macrofiltration process, typically involving the use of depth filters. The depth filters used in macrofiltration may be made of paper, asbestos, plastic or glass fiber. Macrofiltration is frequently used in series with microfiltration to remove larger particles prior to the microfiltration process. This type of multi-stage filtering process can increase the rate at which liquid can be passed through a membrane filter or, in other words, increase the throughput rate. In microfiltration, particles greater than about 200 Angstroms but less than about 100 µm are separated from a liquid typically using a membrane filter as a final filter.

Conventional membrane filters are much thinner and more fragile than depth filters and are typically available in a wide variety of particle retention capabilities and in a variety of materials, shapes and sizes. Membrane filter material may be, for example, nylon, polyethersulfone, PTFE or cellulose acetate. Membrane filters are available generally as either thin discs or in a folded cartridge configuration. Cartridge filters are usually recommended for more quickly filtering large volumes of liquid, such as volumes greater than about 400 liters. These operations may be carried out with the cartridge filter attached in-line and with the liquid flowing from one end of the cartridge to the other.

Often, laboratory or research facility needs may be met using disc-shaped membrane filters having a diameter of, for example, 50 mm to 75 mm. These facilities may not require the throughput rate provided by a cartridge filter, but high throughput is still desirable in order to carry out the filtering procedure as quickly as possible. Larger diameter membrane filters provide a larger throughput rate due to their increased surface area, however, the increase in throughput rate comes at a much greater incremental cost. Therefore, the larger diameter membrane filter units can be undesirable from this standpoint. Also, these types of filtering units typically come preassembled with the disc-shaped membrane filter permanently affixed between upper and lower containers or, alternatively, in an unassembled condition. In this latter case, the user must handle the fragile, disc-shaped membrane filter during assembly. Each of these options has disadvantages in that the pre-assembled filtering unit does not allow versatility in the selection of filter size or pore size following purchase by the user. On the other hand, requiring the user to handle the delicate filter member during assembly may result in damage or contamination. Finally, increasing the throughput rate by prefiltering the liquid is not easily accomplished as it generally necessitates the use of multiple filtering units.

To address various problems in this area, such as the problems mentioned above, it would be desirable to provide a filtering unit having an easily assembled and replaceable filter, such as a membrane filter, and a more efficient and less costly manner of providing a greater throughput rate while retaining the ability to use smaller diameter filters.

SUMMARY OF THE INVENTION

The present invention therefore provides a filtering unit including a first fluid receiving member, such as an upper container, for receiving fluid to be filtered and a second fluid receiving member, such as a lower container, for receiving the fluid from the upper container after the filtration process has taken place. In accordance with the invention, a filter cassette including a support member connected with a flat filter member is configured for disposition between the fluid to be filtered in the upper container and the lower container. The filter cassette is separate and may be removable with respect to each of the upper and lower containers. The cassette is capable of forming a selectively engageable seal between the fluid in the upper container and the lower container to ensure that fluid in the upper container passes through the filter member before passing into the lower container. Preferably, a threaded connection is formed between the upper and lower containers. This allows the lower container to be separated from the upper container after a filtering operation and thereby allows the contents to be stored or used in further processing. In a preferred embodiment, the flat filter member may include a membrane filter and/or a prefilter or depth filter. These filter members may be made from conventional materials as discussed above. The use of both of these types of filter members can allow a multi-stage filtering operation to be performed with a single filtering unit.

Specifically, for multi-stage filtering processes, a plurality of the separately attachable filter cassettes may be connected in a serial fashion between the upper and lower containers. As an option, a single filter cassette could be constructed with two different filter members, such as a prefilter or depth filter and a membrane filter connected in series. As still another option, one filter member may be permanently affixed to the filtering unit while another may be part of the inventive filter cassette. These types of multi-stage filtering unit may be used to increase throughput volume in an easy, efficient and relatively low cost manner.

Also in accordance with the invention, the support member of the filter cassette preferably includes a peripheral seal for engaging an inside wall surface of the upper container. This peripheral seal may be a flexible outer edge portion of the support member or may be a soft, compliant seal member or portion, such as an 0-ring member, connected either integrally with the support member or in a removable manner with respect to the support member. The lower end of the upper container preferably includes a stepped-in portion for centering and engaging the peripheral sealing member in a liquid-tight manner during a filtering operation. This unique configuration, coupled with the use of a peripheral, selectively engageable sealing member allows for easy and consistent sealing engagement to be accomplished by the user between the upper container and the filter cassette. For utilization of the invention in typical laboratory and research settings, the lower container communicates with a port for attaching a source of vacuum. This port may be part of the lower container or, more preferably, part of a coupling between the upper and lower containers. Vacuum introduced through the port helps pull liquid through the filter member or members and into the lower container while the filter member or members trap particles larger than the filter pore size.

The invention further contemplates the provision of a separate filter cassette, as generally described above, for use in a filtering unit having upper and lower containers. A significant advantage of the invention is that the user may purchase the containers, with or without a permanently affixed filter, and purchase the filter cassettes separately. The user may selectively choose the appropriate filter cassette at the time of use according to the filtering needs. In the past, as noted above, this versatility required the user to assemble a filter unit by handling the delicate filter member itself or stock entire preassembled units including the upper and lower containers and the permanently affixed filter member. The present invention eliminates these problems and provides a filter cassette that is much easier to handle without damage or contamination and is more cost efficient to stock.

Methods of filtering are further encompassed by the present invention and are generally defined by the use of filtering units and/or cassettes falling within the scope of the invention. More particularly, these filtering methods can generally include connecting a filter cassette comprising a support member affixed to a flat filter member between fluid receiving members, such as upper and lower containers, with the support member held in sealing but removable engagement with respect to both the upper and lower containers. The filter member thereby provides a liquid flow path from the upper container to the lower container. The method further includes introducing a liquid containing particles into the upper container and onto the filter cassette, and passing the liquid through the filter member and into the lower container to retain the particles in and/or on the filter cassette.

The method can further, and more particularly, comprise connecting the filter cassette within the upper container such as by providing a peripheral seal on the support member and engaging that seal frictionally with an inner wall surface of the upper container in accordance with the inventive principles discussed above. The step of passing liquid through the filter member preferably includes introducing a vacuum into the lower container to actively draw liquid through the filter member. Also in accordance with the inventive concepts, more than one filter cassette may be connected between the upper and lower containers and, to facilitate a multi-stage filtering process, one of the filter members may be a prefilter, while the other filter member may be a final filter. It will be understood that, while one of the filter members will be part of a filter cassette constructed in accordance with the invention, the other filter may be permanently affixed between the liquid in the upper container and the lower container. It will be further appreciated that additional modifications or variances using the inventive concepts disclosed herein are also possible within the scope of this invention.

These and other advantages and objectives of the invention will become more readily apparent to those of ordinary skill in the art upon review of the following detailed description of the presently preferred embodiments of the invention taken in conjunction with the accompanying drawings.

DETAILED DESCRIPTION OF THE PREFERRED EMBODIMENTS

Figure 1:
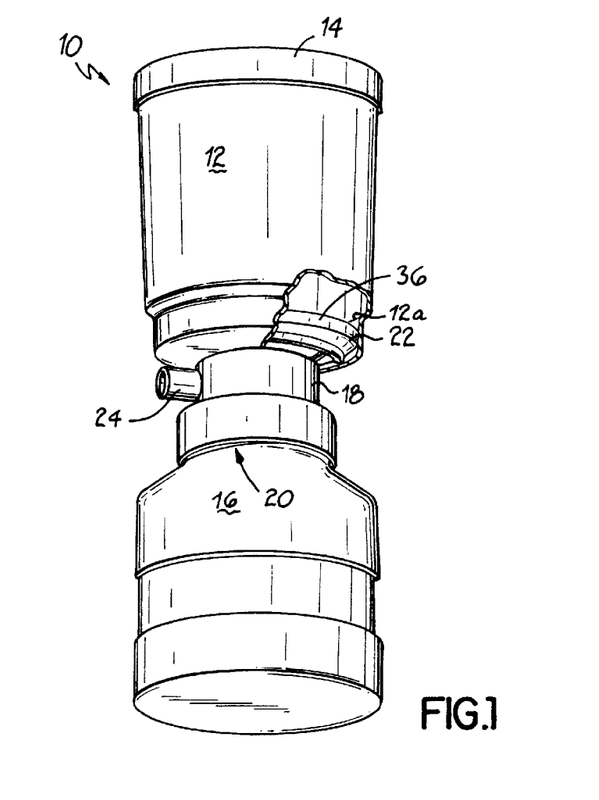
FIG. 1 is a perspective view of a filtering unit constructed in accordance with a preferred embodiment of the invention, with an upper container thereof being broken away to show a filter cassette constructed in accordance with a first embodiment of the invention.

Referring first to FIG. 1, a preferred embodiment of the invention is shown as a filtering unit 10 which may, for example, be used for various liquid filtration procedures performed in laboratory or research settings or many other applications. Filtering unit 10 may comprise an upper container 12 having an upper lid 14 which may be removed to introduce liquid. A lower container 16 is connected to upper container 12 through a coupling 18. Upper container 12, lower container 16 and coupling 18 may be each formed of polystyrene. As one example, this coupling 18 may be permanently affixed to upper container 12, as by welding or adhesively securing these two plastic components together. Coupling 18 is preferably affixed to a threaded neck portion 20 of lower container 16 in a removable manner by including mating internal threads. In this way, both upper container 12 and coupling 18 may be removed from lower container 16 and replaced by a threaded cap (not shown) affixed to threaded neck 20. This allows the filtered contents of lower container 16 to be stored and/or further processed, as necessary.

As one of many possible uses of the invention, a filter cassette 22 is disposed in a lower end of upper container 12 and held in sealing engagement with the inner wall surface 12a of upper container 12. Coupling 18 includes a port 24 which communicates with the inside of lower container 16 and which is disposed downstream of filter cassette 22. In a conventional manner, this port 24 may be connected to a source of vacuum. This draws the liquid contents of upper container 12 through filter cassette 22 while simultaneously trapping particles on or within filter cassette 22. It will be appreciated that filter cassette 22 may alternatively be selectively engaged with a portion of coupling 18, or even a portion of lower container 16, depending on the particular design of filtering unit 10. The objective is to provide a filter cassette which is easily and consistently engageable with a portion of the unit disposed between the liquid contents on either side of the cassette. In the embodiment shown, and as will be described below, filter cassette 22 is easily and consistently engageable in a sealing manner by removing lid 14 and inserting cassette 22 into upper container 12 with a frictional fit. It will be understood that containers 12, 16 may be replaced with other suitable fluid receiving members or structures, such as conduits, which are oriented horizontally or in other manners.

Figure 2:
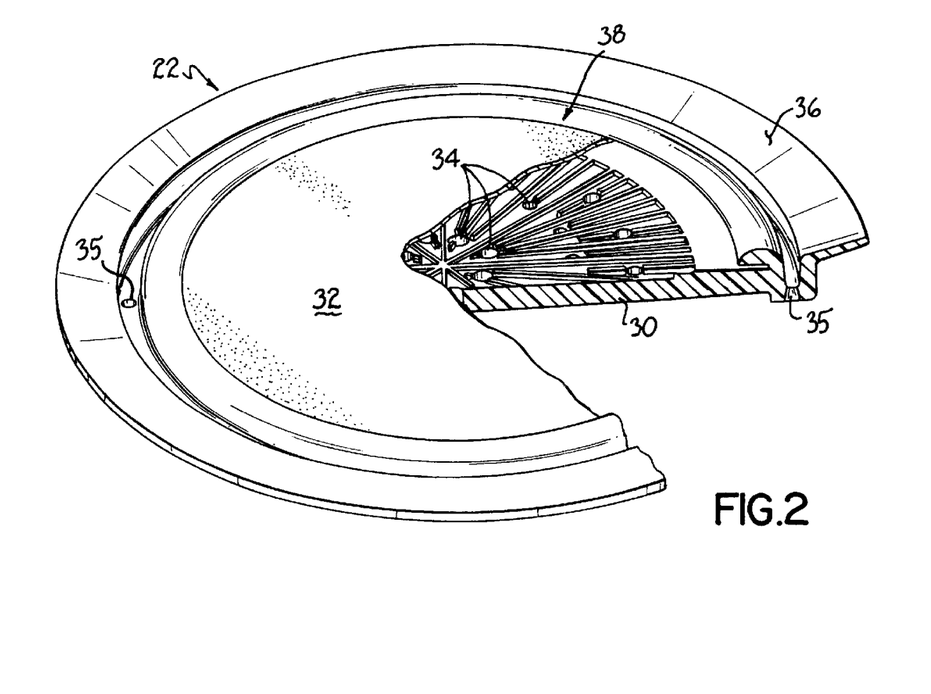
FIG. 2 is a perspective view of the filter cassette shown in FIG. 1, but partially broken away to show internal structure thereof.
Figure 3:
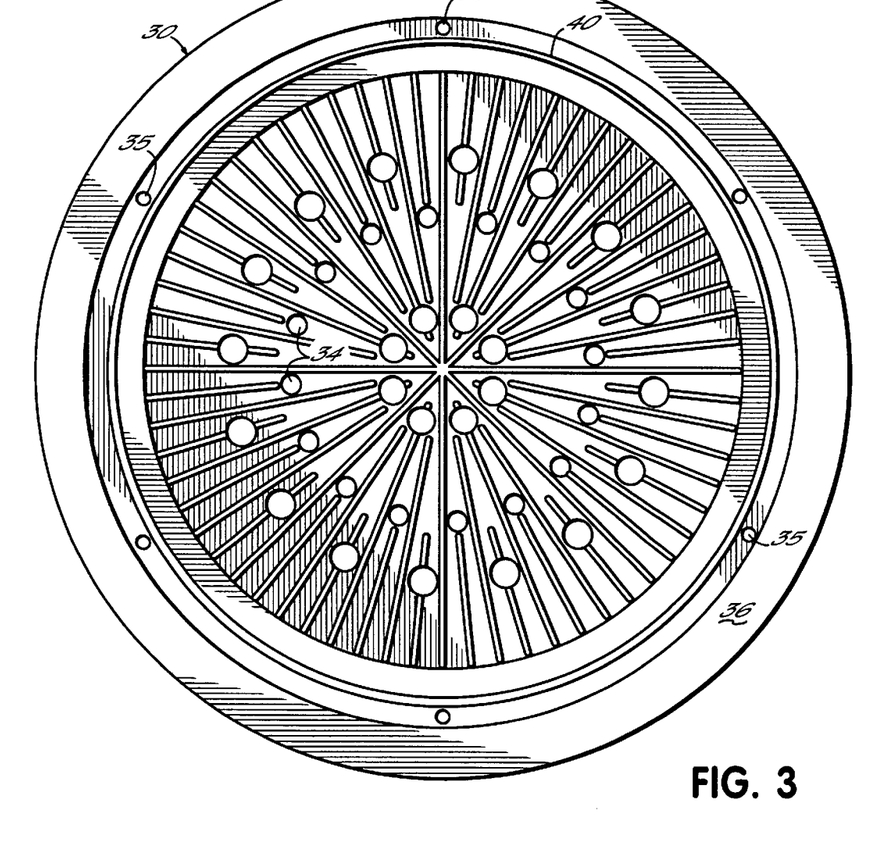
FIG. 3 is a top view of the filter cassette as molded and prior to assembly with the filter member.
Figure 4A:
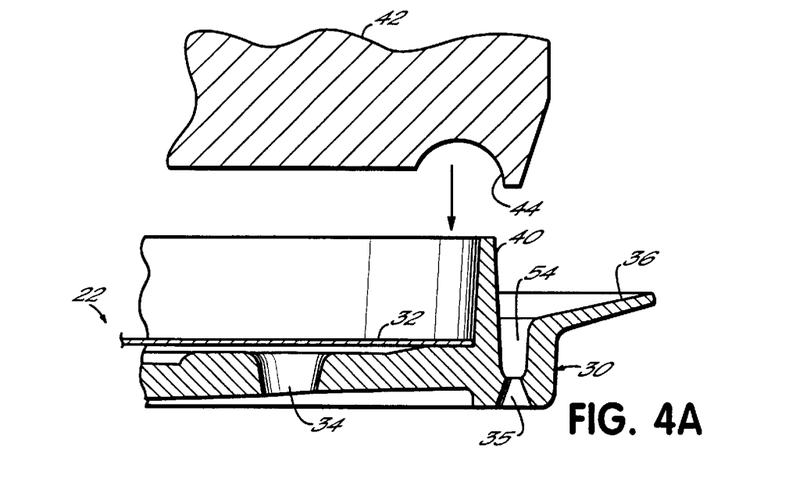
FIG. 4A is a cross sectional view of a peripheral portion of the filter cassette shown in FIGS. 1–3 showing the initial stage of an assembly operation.
Figure 4B:
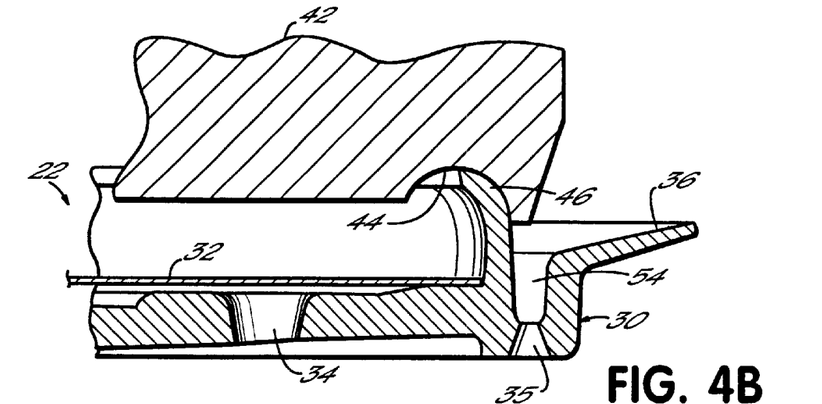
FIG. 4B is a view similar to FIG. 4A, but showing an ultrasonic welding/swaging tool initially engaging the cassette.
Figure 4C:
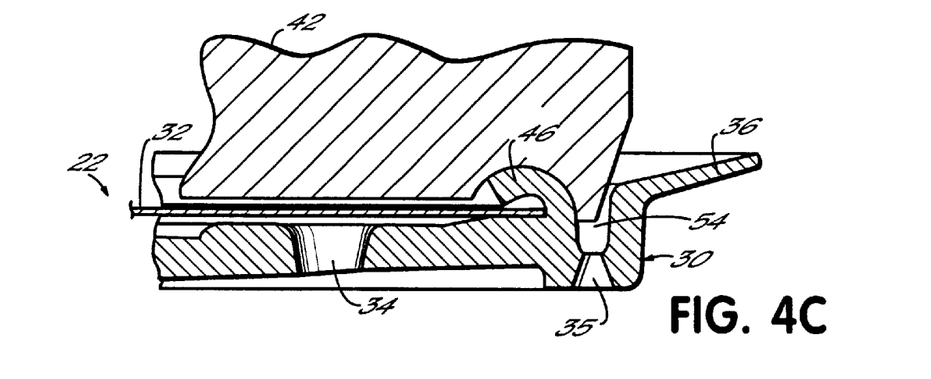
FIG. 4C is a view similar to FIGS. 4A and 4B, but showing the ultrasonic welding/swaging tool near the completion of the welding operation.
Figure 4D:
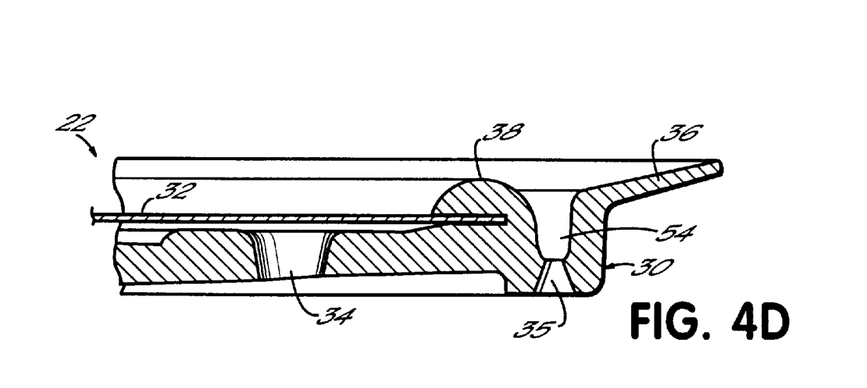
FIG. 4D is a view similar to FIGS. 4A–4C, but showing the final, assembled cassette.

Referring now to FIGS. 2 and 3, filter cassette 22 generally comprises a support member 30 affixed to a flat filter member 32 as a unitary structure. Support member 30 includes holes 34 for allowing liquid to pass fully through filter cassette 22 generally in a downward direction, as viewed in FIG. 2. Holes 34 may be various sizes and of various number, depending on the application. In general, holes 34 may be about 0.10" in diameter. Support member 30 is preferably constructed of polypropylene with a peripheral sealing edge 36 being flexible enough to engage the inner wall of a container or coupling, for example, with a frictional and sufficiently sealing fit as will be described below. Other materials may be used for support member 30 and include polyethylenes such as HDPE.

It will be appreciated that several cassettes 22 may be inserted within upper container 12 in a serial manner to provide a multi-stage filtering unit. For example, an upper cassette may include a prefilter for filtering larger particles and a lower cassette may include a final membrane filter for filtering smaller particles. Of course, dimensional adjustments may have to be made to upper container 12 and/or to the cassettes to accommodate multiple cassettes 22 in this manner. Optionally, a multi-stage filtering operation may be accomplished using one permanently affixed filter and at least one cassette 22 constructed in accordance with the invention. Small holes 35 are disposed outside the circumference of filter member 32 and, for at least some applications, may be necessary to increase throughput through cassette 22. Holes 35 may be on the order of about 0.020"–0.050" in diameter, or other sizes depending on the application. They should be sized sufficiently small to have an acceptably negligible effect on the amount of unfiltered material passing through cassette 22.

Referring now to FIGS. 4A–4D, filter member 32 is preferably retained in place against support member 30 by a retainer 38. This may be accomplished through the use of a swaging operation, or ultrasonic welding operation, to form retainer 38 from a portion of support member 30. In this regard, support member 30 is initially formed by conventional molding apparatus, for example, with a ridge or projecting edge 40 extending in a continuous manner around support member 30. An ultrasonic swaging tool 42 having a suitable recess 44 is activated and brought into contact with ridge or projecting edge 40. It will be appreciated that other types of connections may be formed between support member 30 and filter member 32. For example, such connections may be formed through heating, spin welding or vibration welding operations or one or more separate connecting members may be used to hold filter member 32 in place. Although not shown in the drawings, recess 44 is circular to correspond to the circular ridge 40. Tool 42 is connected with any conventional ultrasonic welding or swaging device. Tool 42 sufficiently melts or softens ridge or projecting edge 40 such that a curved lip 46 begins to extend radially inward across filter member 32. This lip will generally solidify into retainer 38 to hold filter member 32 against support member 30. Retainer 38 may or may not be a completely solid portion as shown, and it may have other constructions or filter member 32 may be secured directly or indirectly in other manners.

Figure 5A:
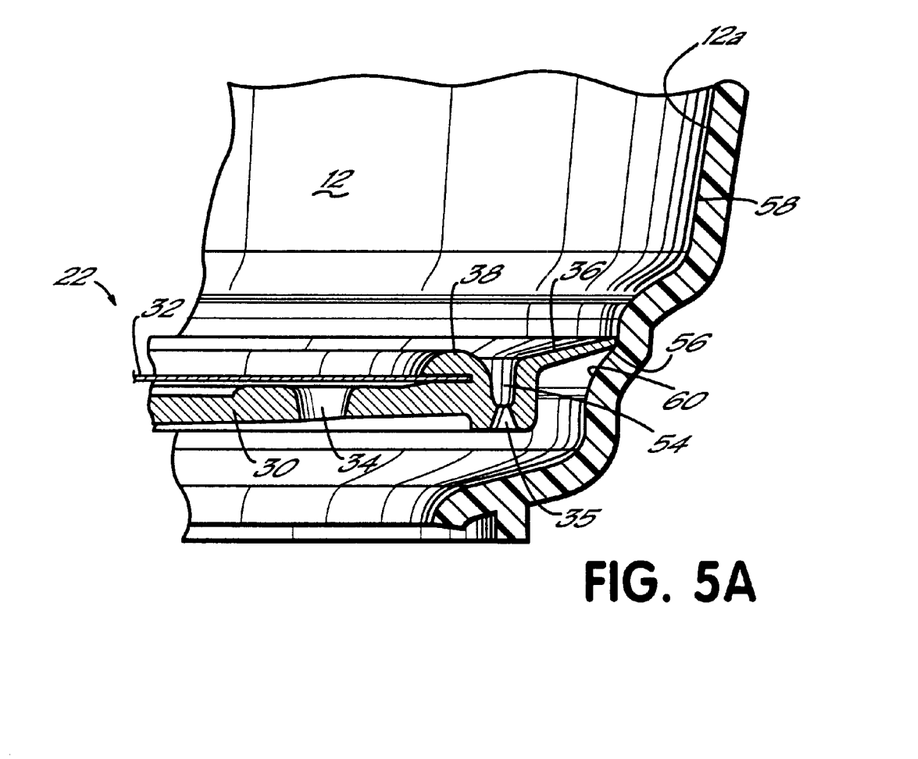
FIG. 5A is a fragmented cross sectional view showing the insertion of the filter cassette into the upper container of the filtering unit.
Figure 5B:
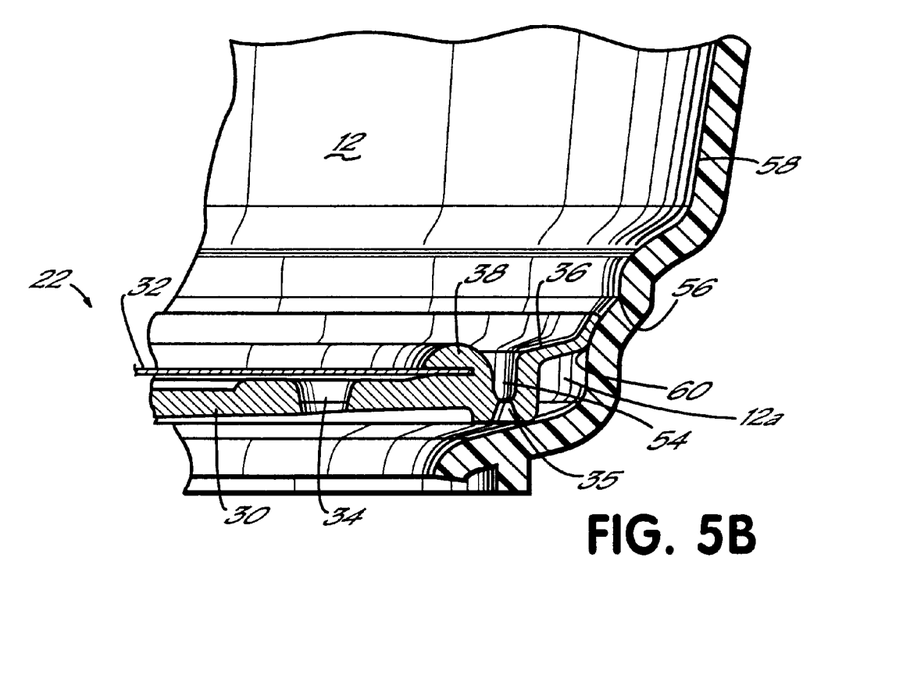
FIG. 5B is a view similar to FIG. 5A, but showing the filter cassette retained in sealing engagement with the lower end of the upper container.
Figure 6:
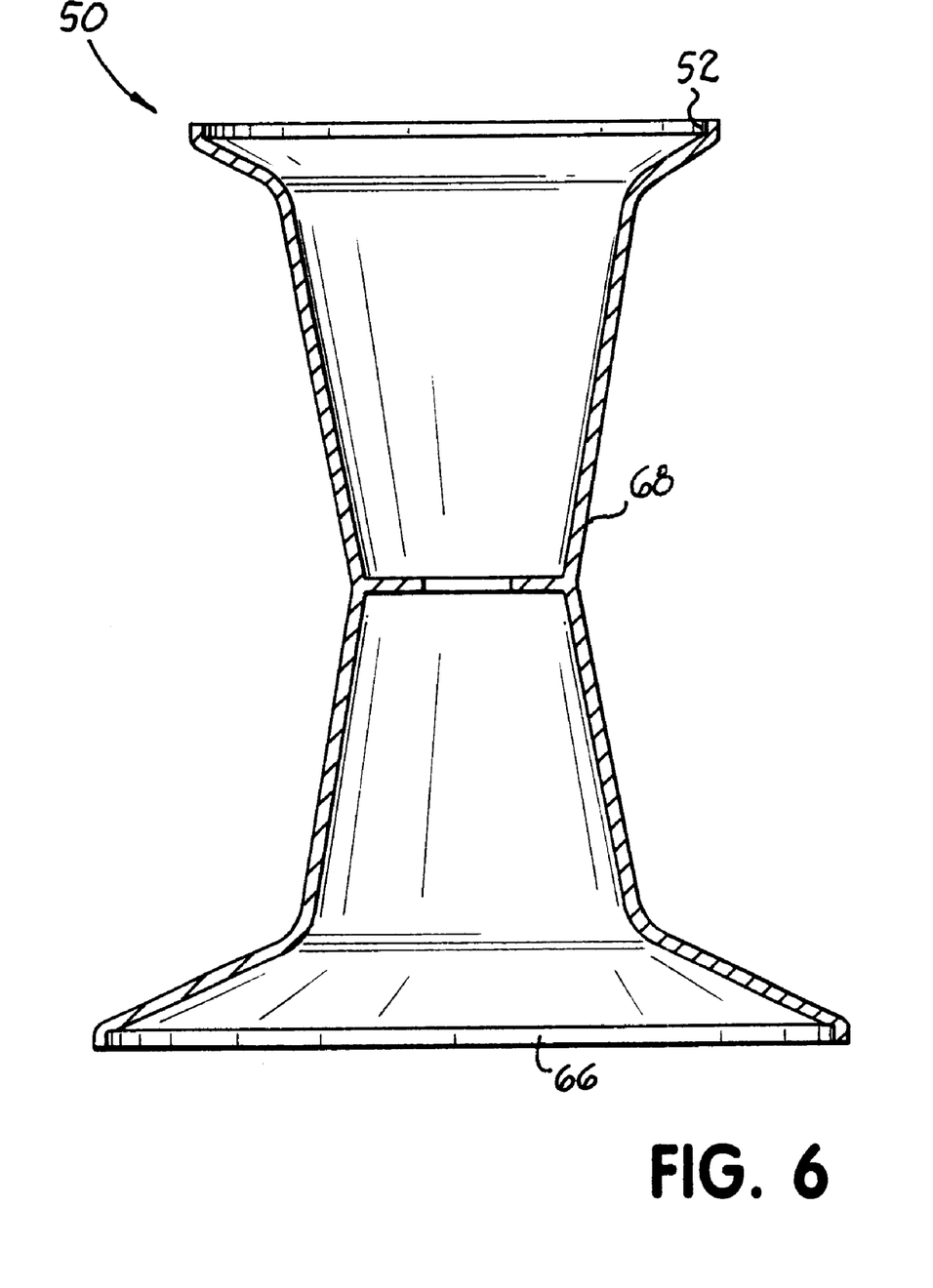
FIG. 6 illustrates a side cross sectional view of a tool which may be used for inserting filter cassettes to the upper container.

Referring to FIGS. 5A, 5B and 6, filter cassette 22 may be easily engaged in a sealing manner within upper container 12, either manually or using a tool, such as tool 50. When using tool 50, a rim 52 thereof may be engaged with a portion 54 of support member 30 to force cassette 22 downward into container 12. As another aspect of the invention, outer sealing edge 36 of support member 30 will engage a lower stepped-in portion 56 of upper container 12. Stepped-in portion 56 is located generally between a larger diameter upper wall portion 58 and a smaller diameter lower wall portion 60. Resilient, flexible sealing edge 36 will engage surface 12a of lower wall portion 60 and flex upward as shown in FIG. 5B to make sealing contact with a frictional fit. While cassette 22 is still preferably removable from upper container 12, the sealing engagement formed by edge 36 will ensure that any liquid introduced into upper container 12 will flow through filter member 32 before entering lower container 16 (FIG. 1). A small amount may flow through holes 35, however, for most applications this will not be a problem. As necessary, holes 35 may be reduced in size or eliminated such as shown in FIG. 7 discussed below.

FIG. 6 illustrates tool 50 in a more complete manner and in accordance with only one possible construction thereof. Rim 52, described with respect to FIGS. 5A and 5B, may be suitable for 50 mm membrane filter cassettes while a second, larger rim 66 may be used to engage 75 mm filter cassettes constructed in accordance with the invention. In the particular tool configuration shown, intermediate portion 68 may be used as a grip during insertion. Of course, any desired cassette and tool sizes may be used in carrying out the invention.

Figure 7:
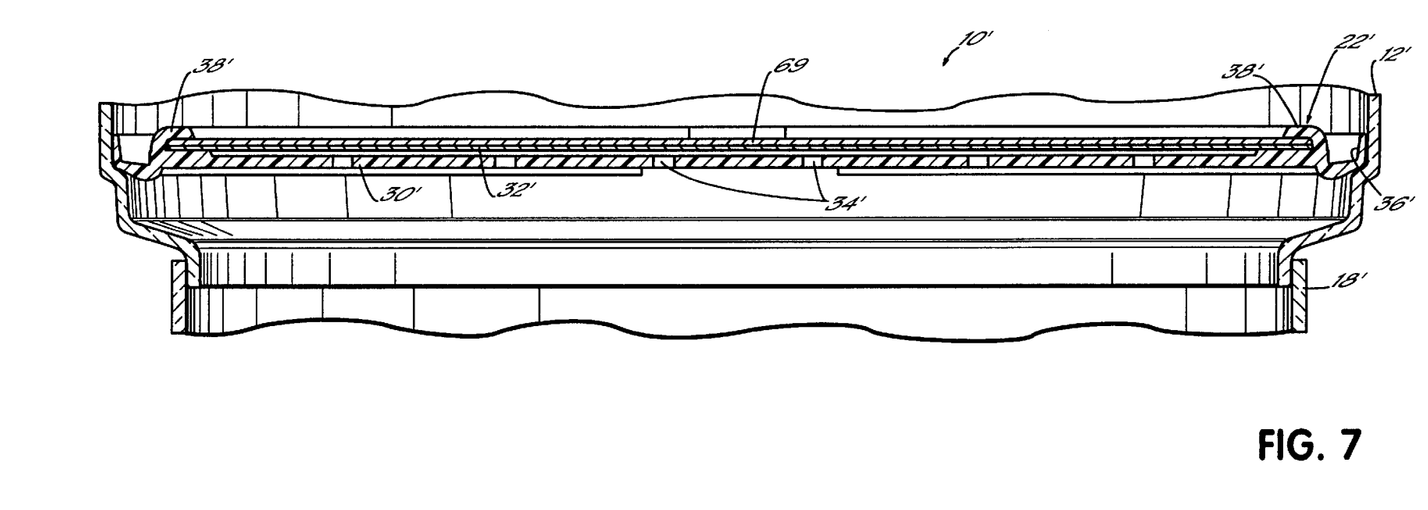
FIG. 7 is a fragmented cross sectional view showing one alternative embodiment of a filter cassette inserted within a container and incorporating two filter members for a multi-stage filtering process.

FIG. 7 illustrates one alternative embodiment of a filtering unit 10' in which like reference numerals having prime marks (') represent like structure with respect to the first embodiment. The only significant difference with this alternative embodiment is that a second filter member 69 has been added on top of, or upstream of, filter member 32'. Filter member 69, for example, may be a prefilter or a filter for removing larger particles than filter member 32'. This is one manner of incorporating a staged filtering process into a single cassette 22' formed in accordance with the invention.

Figure 8A:
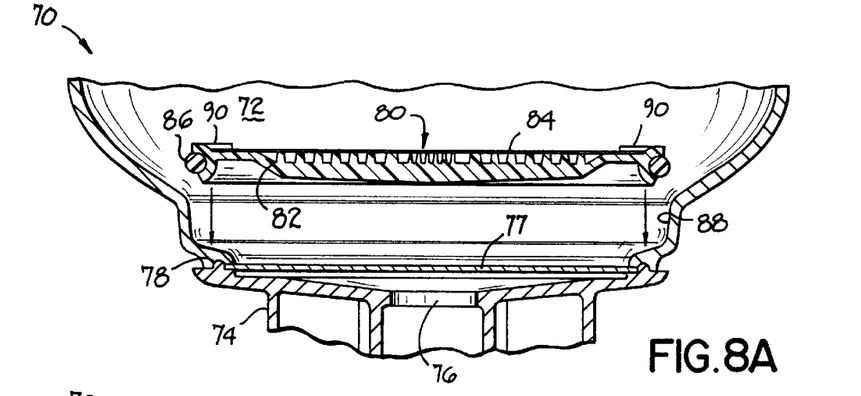
FIG. 8A is a fragmented cross sectional view showing another alternative embodiment of a filter cassette and filtering unit constructed in accordance with the invention.
Figure 8B:
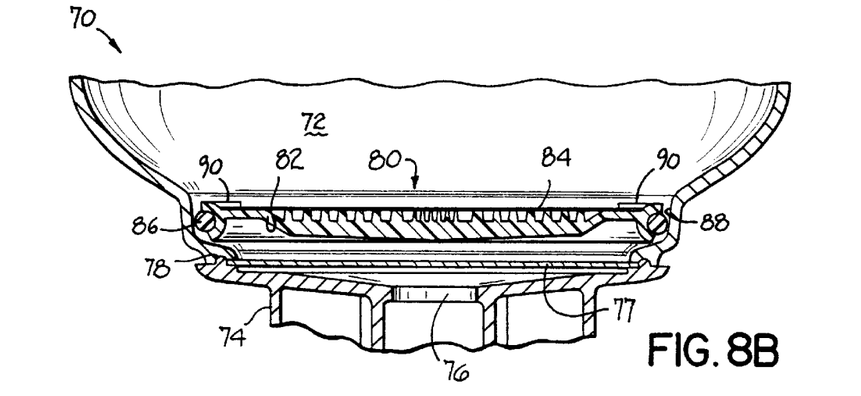
FIG. 8B is a view similar to FIG. 8A, but showing the alternative filter cassette in sealing engagement with a lower end of the upper container.

FIGS. 8A and 8B illustrate another embodiment of a filtering unit 70 comprising an upper container 72 and a coupling 74. Coupling 74 includes a passage 76 for allowing liquid to flow into a lower container (not shown). An optional permanent filter member 77 is also shown in FIGS. 8A and 8B. Filter member 77 may be affixed generally as shown in any conventional, permanent manner. There is a connecting joint 78 formed between coupling 74 and upper container 72 and this joint may either be a separable joint or a permanent joint. An alternative embodiment of a filter cassette 80 is further shown in FIGS. 8A and 8B and includes a support member 82 and a flat filter member 84 in accordance with the invention. Support member 82 includes an outer peripheral seal 86, which may be a separately attachable O-ring or an integral seal member, for example, taking the general shape shown in FIG. 8A. Again, this seal 86 may be formed of conventional rubber or polymeric seal materials. Filter cassette 80 again preferably includes a filter retainer 88 for retaining filter member 84 against support member 82. This may again take the form of a projection which has been suitably swaged against filter member 84 as previously described. As further appreciated from a review of FIG. 8A and the assembled view of FIG. 8B, a stepped-in wall portion 90 is formed in upper container 72 for making sealing, frictional engagement with outer peripheral seal 86. Filter cassette 80 may be inserted manually without any tool or may be inserted through the use of an appropriate tool, for example, which bears against a peripheral upper edge of support member 82 and allows the filter cassette 80 to be forced into the position shown in FIG. 8B.

Figure 9:
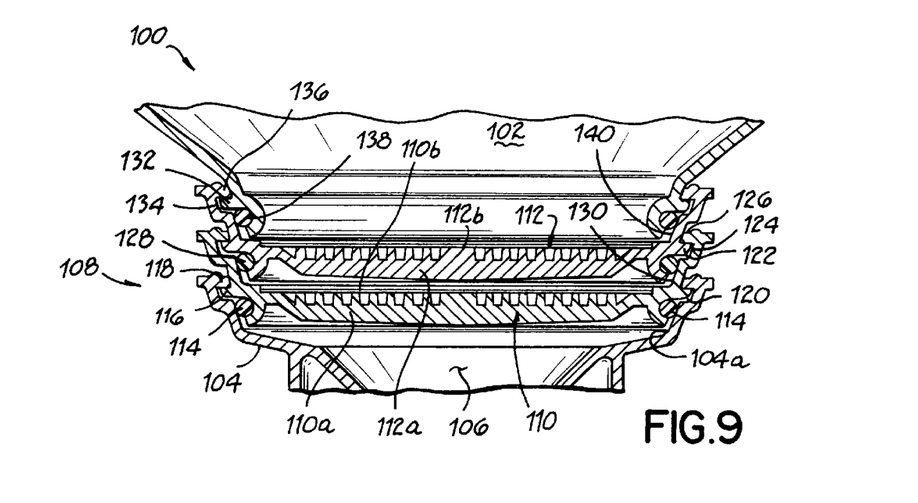
FIG. 9 is a further alternative embodiment, showing a filtering unit having serially connected filter cassettes for a multi-stage filtering operation.

FIG. 9 illustrates another embodiment of a filtering unit 100 constructed in accordance with the principles of this invention. Specifically, filtering unit 100 may include an upper container 102 and a coupling 104 having a passage 106 for receiving filtered liquid and, for example, directing that liquid into a lower container (not shown). A filtering region 108 of unit 100 includes a plurality of filter cassettes 110, 112 connected in a serial manner. Filter cassettes 110, 112 may be constructed with a support member 110a, 112a affixed to a flat filter member 110b, 112b as generally described above with respect to FIGS. 8A and 8B. Differences in the construction of cassettes 110, 112 relate to the interconnection between cassettes 110, 112, upper container 102 and coupling 104.

Specifically, as shown in FIG. 9, filter cassette 110 may include an integral or separable seal 114 engaged with a seal surface 104a of coupling 104. To retain filter cassette 110 connected with coupling 104, a lip 116 of filter cassette 110 snaps beneath a lip 118 of coupling 104. Lip 116 is thereby retained within a recess 120 of coupling 104. To retain filter cassette 112 connected to filter cassette 110, a lip 122 of filter cassette 112 is retained in a recess 124 of filter cassette 110 through engagement with a lip 126 of filter cassette 110. When connected or engaged in this manner, an integral or separable seal member 128 associated with filter cassette 112 engages an inner seal surface 130 of filter cassette 110. To retain filter cassette 112 connected with upper container 102, a lip 132 disposed at the lower end of upper container 102 is snapped or engaged within a recess 134 defined below a lip 136 on filter cassette 112. When engaged in this manner, an integral or separable seal member 138 associated with the lower end of upper container 102 engages a seal surface 140 disposed on the inside of filter cassette 112.

It will be appreciated that several filter cassettes may be serially connected in the manner described with respect to FIG. 9, or in other manners. This will allow an upper filter cassette, such as cassette 112, to be used as a prefilter for filtering larger particles before a microfilter, such as cassette 110 with a membrane filter 110b, is used for final filtration. This increases the throughput volume and eliminates the need for a separate prefiltering step. It will be appreciated that filter cassettes 110, 112, or additional cassettes, may be connected in filtering region 108 without necessarily being connected to one another, as generally described with respect to FIG. 1.

Figure 10:
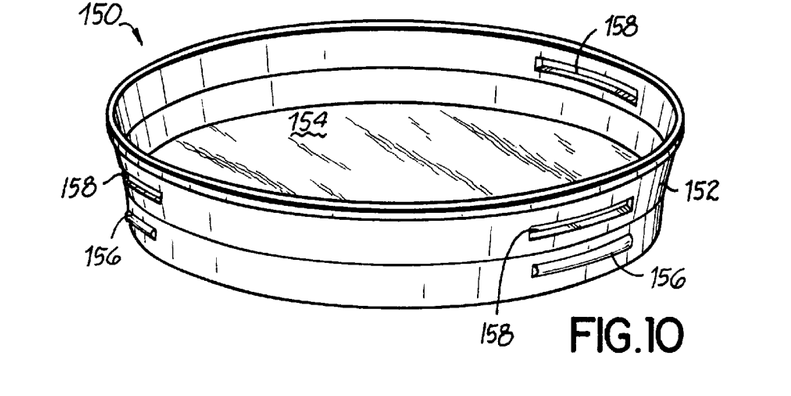
FIG. 10 is a perspective view of another alternative embodiment of a filter cassette constructed in accordance with the invention.

FIG. 10 illustrates yet another embodiment of a filter cassette 150 which allows for a nesting, serial connection of multiple filter cassettes. Filter cassette 150 includes a support member 152 affixed to a filter member 154. Filter member 154 may be affixed in a nonremovable fashion, such as by ultrasonically welding or adhesively securing filter member 154 to support member 152. Support member 152 includes a plurality of male connectors 156 and a like plurality of female connectors 158.

Figure 11:
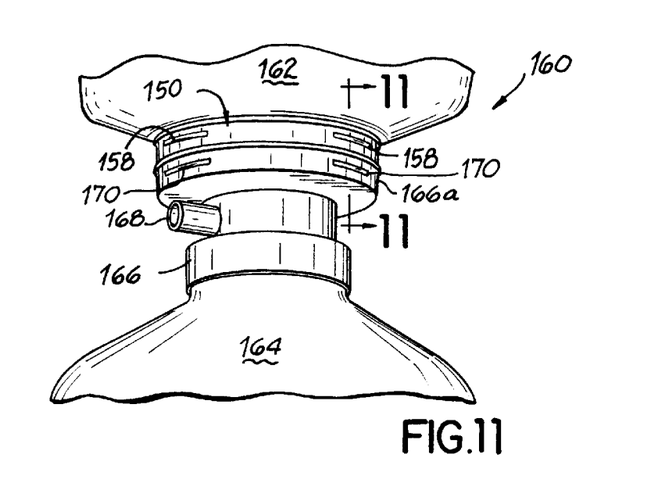
FIG. 11 is a partially fragmented perspective view showing the filter cassette of FIG. 9 engaged in a filtering region between upper and lower containers.
Figure 12:
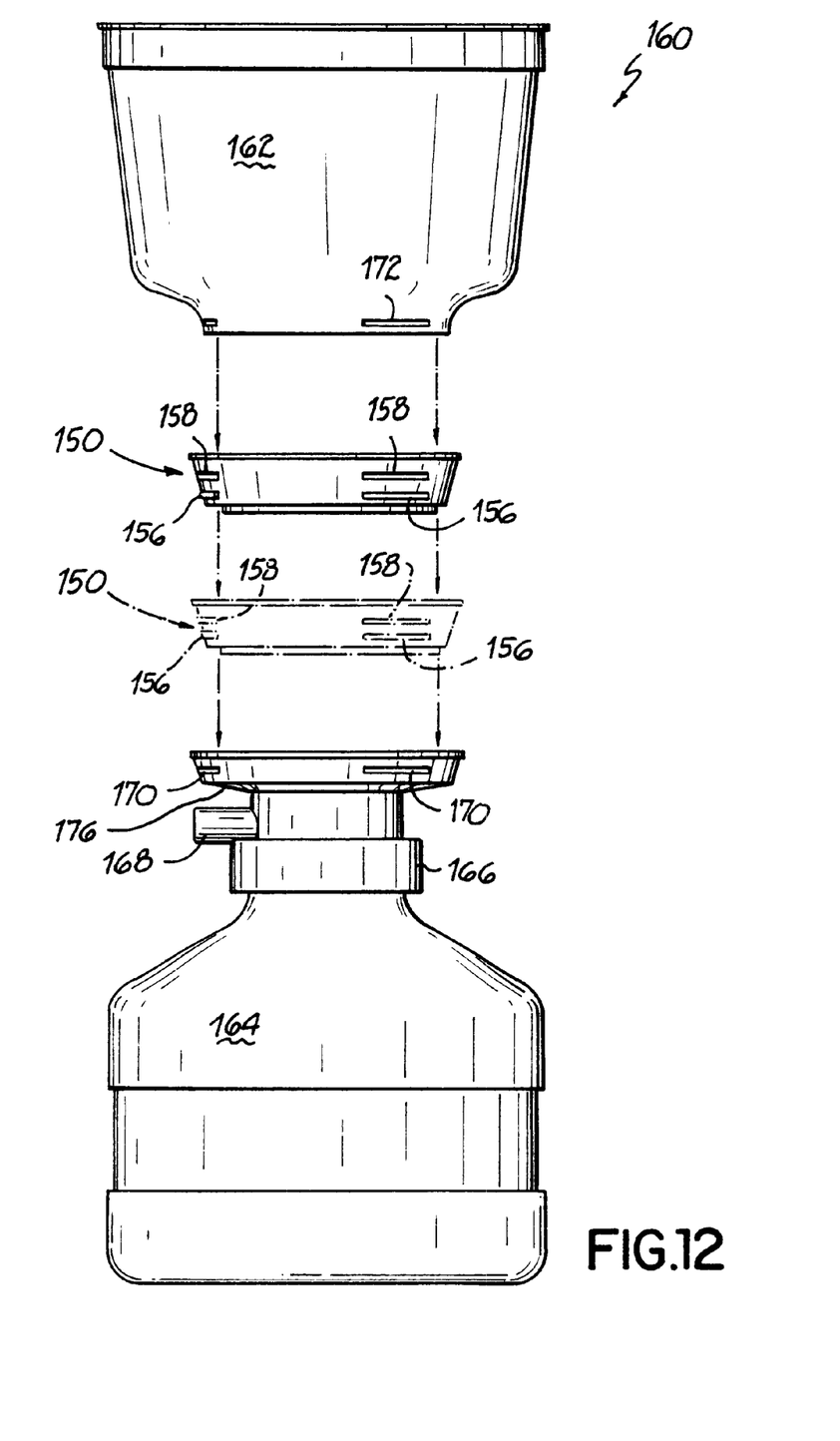
FIG. 12 is a disassembled side view of the filtering unit shown in FIG. 11.

Referring to FIGS. 11 and 12, filter cassette 150 may be utilized as part of a filtering unit 160 including an upper container 162 and a lower container 164 connected to one other preferably in a separable manner using a coupling 166 similar to those described above. Coupling 166 may therefore include a port 168 for introducing a vacuum to lower container 164. Filter cassette 150 or, optionally, a plurality of filter cassettes 150 may be retained between upper container 162 and coupling 166 as shown in FIG. 12.

Figure 13:
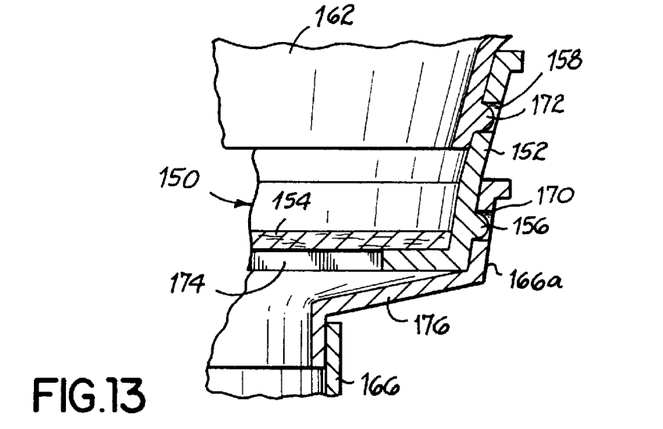
FIG. 13 is an enlarged and fragmented side cross sectional view of the filtering unit shown in FIG. 11 taken in the vicinity of the filtering region.

As more specifically shown in FIG. 13, male connectors 156 may be retained with a snap fit within complementary female connectors 170 disposed along flange portion 166a of coupling 166. Likewise, female connectors 158 of filter cassette 150 may receive complementary male connectors 172 disposed along a lower end of upper container 162. As with the other embodiments, support member 152 is pervious to liquid flow, such as through the provision of radial slits 174. Liquid flow from upper container 162 through filter member 154 and support member 152, and down an inclined portion of coupling 166 into lower container 164. As with the previous embodiments, filtering unit 160 may be configured with any desired number of filter cassettes 150 to perform a multi-stage filtration process and increase throughput volume.

Although the connecting and sealing structure and the general configuration of the various cassettes 22, 80, 150 may vary such as described above, the operation and use of the invention will be generally understood with reference to FIGS. 1, 2 and 5A–5B. Specifically, the user may stock a number of different cassettes 22 and separately stock containers 12 and 16, as well as coupling 18 which may be permanently or removably affixed to container 12. Various cassettes, having the same dimensions for sealing engagement with container 12, may have different types of filters for filtering different sized particles from a liquid. Thus, the method begins by choosing the appropriate cassette 22, removing lid 14, and inserting cassette 22 into upper container 12. This may be accomplished through the use of a tool as illustrated in FIG. 6. For a multi-stage filtering process, an additional cassette (not shown) may be inserted on top of cassette 22. For this purpose, it may be necessary to lengthen lower portion 60 of upper container 12.

Either before or after the insertion of the desired cassette or cassettes, lower container 16 is threaded into coupling 18 as shown in FIG. 1. A source of vacuum is then connected to port 24 and turned on. The liquid to be filtered is then introduced through the open end of upper container 12. Turning on the vacuum prior to filling upper container 12 with liquid has been found to increase the throughput rate, especially when using two membranes separated by spacing large enough to promote a blocking effect or having other configurations that promote a blocking as discussed below.

This may be the case where a cassette in accordance with the invention is inserted on top of a permanently connected membrane filter or, for example, in the case where multiple filter cassettes are used to filter the liquid in a serial manner. Specifically, it was found that the air gap created between two filter membranes impedes the transfer of liquid from the upper container into the lower container when both filters have been initially wetted by the liquid. Turning the vacuum on prior to pouring the liquid into the upper container helps prevent this blocking effect and significantly improves the throughput rate. Holes 35 disposed within support member 30 also help defeat this blocking effect. Specifically, liquid will be drawn through holes 35 to help fill any gap between the filter cassette and any second filter member with the liquid. The vacuum thereby efficiently draws the liquid through cassette 22, as well as any additional, serially disposed filter member or cassette, while trapping particles greater than a desired size on or within filter member 32 and any additional serially disposed filter members.

Upon completion of the filtering procedure, lower container 16 may be unthreaded from coupling 18 and a threaded cap (not shown) may be used to close container 16 until needed for further processing or analysis. In addition, filter cassette 22, or any additional filter cassettes inserted into container 12 may be removed and the particles or material trapped by the filter may be appropriately analyzed, as necessary. Typically, all the various components of filtering unit 10 will be disposed of following use. Those of ordinary skill will readily recognize many additional filtering procedures which may be carried out in accordance with the inventive concepts. These may include the use of filter cassettes and/or permanent filters between containers or between conduits of various types.

While the present invention has been illustrated by a description of various preferred embodiments and while these embodiments have been described in considerable detail in order to describe the best mode of practicing the invention, it is not the intention of Applicants to restrict or in any way limit the scope of the appended claims to such detail. Additional advantages and modifications within the spirit and scope of the invention will readily appear to those skilled in the art. The invention itself should only be defined by the appended claims, wherein we claim:

What is claimed is:

1. A filtering unit comprising:
   an upper container having a wall with a first upper opening for receiving fluid to be filtered, said wall further having an inside wall surface,
   a lower container having a second upper opening for receiving the fluid from the upper container, and
   a filter cassette including a support member connected with a flat filter member, said filter cassette being configured for disposition between the fluid to be filtered in the upper container and the lower container and being separable from each of the upper and lower containers, said filter cassette configured to be received through said first upper opening and said support member including an integral resilient peripheral edge forming a seal for engaging the inside wall surface of the upper container, said edge deforming toward said first upper opening when making sealing engagement with the inside wall surface and thereby forming a selectively engageable seal between the fluid in the upper container and the lower container to ensure that fluid in the upper container passes through the filter member before passing into the lower container.

2. The filtering unit of claim 1, wherein the filter member is a membrane filter.

3. The filtering unit of claim 1, wherein the filter member is a depth filter.

4. The filtering unit of claim 1 further comprising a port communicating with the lower container for attachment to a source of vacuum.

5. The filtering unit of claim 1, wherein the peripheral seal is circular and the flat filter member is retained against the support member by a continuous lip extending radially inward at a peripheral portion of the support member.

6. The filtering unit of claim 5, wherein the lower end of the upper container includes a stepped-in portion for centering and engaging the peripheral seal during a filtering operation.

7. The filtering unit of claim 1 further comprising a threaded connection formed between the upper and lower containers.

8. A filter cassette for use in a filtering unit having first and second fluid receiving members in fluid communication with each other and with said filter cassette adapted for disposition in a filtering region located in a lower portion of the first fluid receiving member, the filter cassette comprising:
   a flat filter member having an outer edge,
   a support member affixed to the flat filter member and having a peripheral portion disposed proximate to the outer edge of the flat filter member, the peripheral portion including an integral resilient peripheral edge forming a seal operative to selectively engage and disengage the filtering region and, when in a sealingly engaged position, ensuring that fluid in the first fluid receiving member passes through the filter flat member before entering the second fluid receiving member, wherein the support member is configured to be removably received through an opening in an upper end of the first fluid receiving member and moved to the sealingly engaged position adjacent the second fluid receiving member, said edge deforming upwardly toward the opening in the upper end of the first fluid receiving member when making sealing engagement with an inside wall surface in the filtering region.

9. The filter cassette of claim 8, wherein the support member includes a tool engagement portion for receiving a tool used to insert the cassette within the first fluid receiving member.

10. The filter cassette of claim 8, wherein the filter member is a membrane filter.

11. The filter cassette of claim 8, wherein the filter member is a depth filter.

12. A filtering unit comprising:
   a first member having a fluid receiving space defined by an inside wall surface and including a first opening for receiving fluid to be filtered,
   a second member having a fluid receiving space and a second opening communicating therewith for receiving the fluid from the first member, and
   a filter cassette including a support member connected with a flat filter member, said filter cassette being configured for disposition between the fluid receiving space of the first member and the fluid receiving space of the second member and being separable from each of the first and second members, said filter cassette configured to be received through said first opening and said support member including an integral resilient peripheral edge forming a seal for engaging the inside wall surface of the first member, said edge deforming toward said first upper opening when making sealing engagement with the inside wall surface and thereby forming a selectively engageable seal against the inside wall surface and between the fluid receiving space of the first member and the fluid receiving space of the second member to ensure that fluid in the first member passes through the filter member before passing into the second member.

13. A filtering unit comprising:

a first member having a fluid receiving space defined by an inside wall surface and including a first opening for receiving fluid to be filtered, a second member having a fluid receiving space and a second opening communicating therewith for receiving the fluid from the first member, a first flat filter connected between the fluid receiving space of the first member and the fluid receiving space of the second member, and a filter cassette including a support member permanently connected with a second flat filter, said filter cassette being configured for disposition between the fluid receiving space of the first member and the fluid receiving space of the second member and being separable from each of the first and second members, said filter cassette configured to be received through said first opening and including an integral resilient peripheral edge forming a seal for engaging the inside wall surface of the first member, said edge deforming toward said first upper opening when making sealing engagement with the inside wall surface and thereby forming a selectively engageable seal against the inside wall surface and between the fluid receiving space of the first member and the fluid receiving space of the second member, wherein fluid in the first member passes through the first and second filters before passing into the second member.

14. A method of filtering liquid with a filter cassette including a support member nonremovably affixed to a flat filter member, the method comprising:

inserting the filter cassette into the first fluid receiving space through an upper open end of the first fluid receiving member;

deforming an integral resilient peripheral edge of the support member upwardly against an inside wall surface of the first fluid receiving member to form a sealing but removable engagement between the peripheral edge and the inside wall surface, the filter member thereby providing a liquid flow path from the first fluid receiving member to the second fluid receiving member, introducing a liquid containing particles into the first fluid receiving member and onto the filter cassette, and passing the liquid through the filter member and into the second fluid receiving member to retain the particles on the filter cassette.

* * * * *